United States Patent
Smith et al.

(10) Patent No.: US 7,596,753 B2
(45) Date of Patent: Sep. 29, 2009

(54) TEXT ENTRY DIALOG BOX SYSTEM AND METHOD OF USING SAME

(75) Inventors: Glenn R. Smith, Santa Clara, CA (US); Letitia K. Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1714 days.

(21) Appl. No.: 09/829,721

(22) Filed: Apr. 10, 2001

(65) Prior Publication Data

US 2002/0147744 A1    Oct. 10, 2002

(51) Int. Cl.
G06F 17/00    (2006.01)
(52) U.S. Cl. .................. 715/256; 715/255; 715/259
(58) Field of Classification Search ............... 715/500, 715/512, 526, 200, 256, 255, 259, 262; 345/784, 345/785, 786
See application file for complete search history.

(56) References Cited

U.S. PATENT DOCUMENTS

| | | | |
|---|---|---|---|
| 5,517,605 A | | 5/1996 | Wolf |
| 5,623,588 A | * | 4/1997 | Gould ..................... 345/787 |
| 5,751,980 A | | 5/1998 | Musashi et al. |
| 5,796,945 A | * | 8/1998 | Tarabella ................ 709/219 |
| 5,825,355 A | * | 10/1998 | Palmer et al. ........... 345/712 |
| 5,828,374 A | * | 10/1998 | Coleman et al. ........ 345/786 |
| 5,859,638 A | * | 1/1999 | Coleman et al. ........ 345/786 |
| 6,061,063 A | * | 5/2000 | Wagner et al. ........... 345/784 |
| 6,177,938 B1 | * | 1/2001 | Gould ..................... 345/784 |
| 6,208,343 B1 | * | 3/2001 | Roth ....................... 345/786 |
| 6,252,594 B1 | * | 6/2001 | Xia et al. ................. 345/786 |
| 6,476,831 B1 | * | 11/2002 | Wirth et al. ............. 345/784 |
| 6,583,795 B1 | * | 6/2003 | Ohyama .................. 345/785 |

OTHER PUBLICATIONS

Microsoft, Microsoft Word 2000 Screen Shots, Copyright 1999, Screen Printouts pp. 1-2.*
William B. Hayes, Using PowerBuilder 6, published by QUE Corporation in 1997, print out pp. 1-4 (also known as pp. 181 and 331).*
Microsoft, Microsoft Word 2000 Screen Shots, Copyright 1999, Screen Printouts pp. 1-4.*

* cited by examiner

Primary Examiner—Stephen S Hong
Assistant Examiner—Gregory J Vaughn
(74) Attorney, Agent, or Firm—Tucker Ellis & West LLP

(57) ABSTRACT

A text entry dialog box (62) is disclosed for use with an associated window and associated user. A text entry space (64) is provided for text entry by the user. A memory (82) stores previous text entries. A selection button (70) is displayed when the memory (82) contains at least one previous text entry. A selection list (72) is displayed when the selection button (70) is selected by the user. The invention may alternately be viewed as a modified drop-down list box (62). The text line (64) is editable, and the visibility of the drop-down selection arrow (70) is conditional upon the selection list (72) containing at least one entry. Preferably, a parser (102) parses the edited text line contents, and the selection list (72) contains previous text entries entered in the editable text line (64), parsed by the parser (102), and containing at least one character after the parsing.

12 Claims, 5 Drawing Sheets

(a)

(b)

(c)

(d)

TEXT ENTRY DIALOG BOX SYSTEM AND METHOD OF USING SAME

BACKGROUND OF THE INVENTION

The present invention relates to a graphical user interface (GUI), and more particularly to an improved text entry dialog box system for user input of text and a method of using same. The word "text" as used herein is to be broadly interpreted to encompass any alphanumeric information, including but not limited to: ordinary text, computer commands, numeric values represented by alphanumeric strings, and the like. "Alphanumeric" refers to letters, digits, punctuation symbols, and the like, represented for example in the conventional ASCII format although alphanumeric should not be construed as being limited thereto.

As is well known to those skilled in the art, a GUI interface typically includes a plurality of pictorial representations, or icons, each icon representing a specific entity such as a program, data file, folder, or other element. A pointing device such as a mouse, track-ball, or touch-sensitive screen permits the user to indicate and select a particular icon and thereby launch the associated object. GUI interfaces are usually layered in that selection of an icon may introduce one or more new screen areas, or windows, which provide the user with additional icons. Selection of a folder icon, for example, may open a new window containing icons representing objects contained within the parent folder.

Various GUI interfaces have been widely adopted in various forms, with well known commercial embodiments including the Microsoft Windows, UNIX X-Windows, and the Macintosh Mac OS operating systems. Programs running under these operating systems also usually use a GUI interface. GUI has been found to be an extremely user-friendly format for human-computer interfacing. The use of intuitive GUI interfacing greatly speeds user training and minimizes user effort as measured by keystrokes, mouse clicks, and the like required to accomplish a task. The GUI approach also meshes extremely well with the object-oriented programming paradigm presently preferred for software development.

FIG. 1 shows a typical data entry window 10 provided by a GUI interface. The GUI interface does not direct the user through a fixed, linear sequence of data entry steps. Rather, a typical GUI interface provides a complete data entry form with a large number of simultaneously available input dialog boxes. A distinctive feature of the GUI interface is the typically wide range of available input dialog box types. The GUI interface minimizes user effort by providing sophisticated data entry dialog boxes such as check boxes 12, toggle buttons 14, list boxes 16 and 18, text entry boxes 20, and the like. Often, one or more activation buttons 21 such as the "CONTINUE" 22, "BACK" 24, and "HELP" 26 buttons of FIG. 1 are also provided to initiate various operations.

The user selects, or focuses upon, a particular input dialog box either by selecting it with the pointing device or through a keyboard combination, such as by pressing TAB. After supplying the data, the user defocuses from the dialog box, again either through the pointing device or the keyboard. Typically pressing ENTER will defocus from the current entry dialog box. Defocusing from the dialog box registers, or "enters", the supplied data.

The dialog boxes used in GUI interfaces are intuitive in part because they limit the number of choices available to the user. For example, the list box 16 limits the user to five age ranges, while list box 18 presumably contains entries corresponding to the names of states, such as "California" or "Ohio". The data entry window 10 allows the user to input data to the dialog boxes in any order. For example, at the time instant illustrated in FIG. 1, the "Name" 20, "Gender" 14, and "I will be attending" 12 dialog boxes had already been filled out. The user is currently filling out the "Age" list box 16, while the "State of Residence" list box has not yet been filled out, as indicated by the blank space 28.

Another advantage of GUI dialog boxes is that they often can be operated entirely by the pointing device rather than requiring keyboard entry. Referring to the "Age" list box 16 of FIG. 1, the list of age ranges 30 was brought up by selecting the drop down arrow 32 using the pointing device, and the particular age range will subsequently be selected by again using the pointing device. The user never needs to make use of a keyboard to fill out "Age" list box 16. Avoidance of free-form text entry also simplifies post-input processing through elimination of the text parsing step wherein extraneous spaces and other characters are stripped away and the text is verified to be in an acceptable format, such as a numeric format if the input requires a numeric value.

In spite of the advantages of these sophisticated input dialog boxes, GUI interfaces nonetheless necessarily often utilize conventional free-form text entry dialog boxes, such as the "Name" dialog box 20 of FIG. 1. Text entry boxes are indispensable for input of data which is not predictable, such as a personal name 34. Because a name cannot be predicted a priori, a list box or other pointing-device driven input box cannot be applied, and the user must enter the data using a keyboard. Because of the inherently unknown nature of free-form text entry, the prior art teaches very few methods for facilitating this type of input in a GUI environment.

The operation of a typical text entry dialog box is illustrated in greater detail in FIGS. 2(a), 2(b), 2(c), and 2(d). The user is initially presented with a blank entry line 40 as shown in FIG. 2(a). In order to type text, the user first focuses on the entry line such as by pointing to the line and clicking or the like, and thereafter types the data 42 via the keyboard as shown in FIG. 2(b). Next, the user defocuses to enter the text 42 as shown in FIG. 2(c). Typically, an insert location marker or cursor 44 is shown while the entry line is focused and data is being entered. The cursor marks where the next character will be typed. The cursor typically disappears when the user defocuses from the entry line, as shown in FIG. 2(c). If the user later wishes to enter a different text, the entry line 40 must be refocused as shown in FIG. 2(d). Refocusing brings back the cursor 44, typically positioned at the end of the previously entered text 42. In order to enter new text the previously entered text must be deleted, usually through the use of the keyboard "DELETE" or "BACKSPACE" key, and then the new data is typed and the entry line defocused.

One area where the GUI interface has the potential to improve upon this conventional text entry is in the case where the user is likely to want to re-enter previously entered text. Situations of this type arise, for example, when using a search window. Considering a search window as a typical example of such situations, the user typically enters search parameters in multiple input dialog boxes contained within the search window. The dialog boxes typically include one or more free-form text entry dialog boxes. The search is initiated by operating a "START" button or the like also contained within the search window. If the returned results are unsatisfactory, various search parameters may be modified to find optimum search parameters. In this process, the user often will want to return to a previously used search parameter. With a conventional text entry dialog box, the parameter must be re-typed, and for a search the typed text must usually be exactly identical to the previous entry to produce a valid comparison with previous search attempts.

The prior art teaches using a modified drop-down list box in this case. Such a box appears to be identical to the list boxes 16 and 18 of FIG. 1, except that the list entries in the modified box consist of text entries previously entered in the blank space left of the drop-down selection arrow or button. The user may then operate on the drop-down selection button and select a previous entry using the pointing device similarly to the way list box options are selected. Such a modified drop-down list box is sometimes called a drop-down combination box.

This prior art combination box solution is unsatisfactory because it is often confusing to the user. As illustrated in FIG. 3(a), the user initially encounters the combination box. The unedited box 50 consists of a blank line or space 52 and a dropdown selection button or arrow 54. To the user, this box appears identical to the unedited "State of Residence" list box 18 shown in FIG. 1, and is therefore likely to be interpreted by the user as a list dialog box rather than as a text entry dialog box. This is because in a conventional GUI interface, the user typically associates an isolated blank line or space with a free-form text entry dialog box, while a box with a drop-down arrow or selection button is associated with a list box containing a list of available selections. In the case of the prior art drop-down combination box 50, the user is initially presented with an unfamiliar dialog box which shows a blank space coupled with a drop-down arrow button 54. This box is confusing because it looks like a drop-down list box, but does not function like a drop-down list box.

The correct user action for the drop-down combination box 50 of FIG. 3(a) is to focus on the entry blank section 52 and type in some text, because upon startup of the combination dialog box there are no initial previous text entries and so the list is empty. However, human nature tends to instead focus upon and operate the drop-down arrow button 54 to hunt for selections or options. As shown in FIG. 3(b), this action brings up a blank list 56. The blank list 56 further confuses the user and additionally may require the user to type something into the text entry section 52 of the combination box in order to defocus, even if the user is not yet ready to do so and does not know what to type because the user had expected to obtain a list of options in accordance with the expected operation of a list box.

To alleviate this problem, the prior art also teaches a modification of the drop-down combination box wherein the list includes a default initial text. Many Internet browsers, for example, use such a modified combination box as the address line dialog box. The default address is usually an intuitively clear phrase such as "Blank page". This modified drop-down combination box may reduce confusion for the user, but it also places irrelevant, and usually unwanted, text into the text entry section of the combination box. In order to enter meaningful text the user must first delete the unwanted default text, which increases user effort and adds to the frustration. The modified combination box also retains an unconventional appearance which is indistinguishable from a list dialog box. The user may be misled into believing the modified drop-down combination box actually is a list box. Because a list box does not allow free-form text entry, the user may therefore fail to take advantage of the text-editing capability of the drop-down combination box and instead limit his activities to the default value(s) presented.

There remains, therefore, a need for an improved text entry dialog box, which retains the appearance of a conventional text entry line while providing a way to recall previously entered text. The present invention contemplates such an improved text entry dialog box.

SUMMARY OF THE INVENTION

In accordance with one aspect of the present invention, a text entry dialog box system for use with a processor, a display device, a main memory, data input means including pointing means, means for storing an operating system and at least one application program, and means for loading said operating system and said application program into main memory is disclosed. The text entry dialog box system displays on a screen of said display device a dialog box into which a user enters data during execution of said application program. A text entry space is provided for free-form text entry by the associated user. A memory provides for storing text items, and a means for selectively displaying a selection button is provided.

Preferably, the text entry dialog box system includes means for selectively displaying the selection button when the memory contains at least one previous text entry. A parser provides for parsing the free-form text entry prior to storage in the memory, the storing being conditional on the parsed entry containing at least one character. The system preferably also includes means for selectively displaying a list of previously entered text items when the selection button is selected by the associated user. The selection button may be a drop-down arrow button, and the list may be a drop-down list. Preferably, a means is provided for initializing the memory as empty each time the associated window is started.

In accordance with another aspect of the present invention, a computer implemented method for facilitating input of text by an associated user using a dialog box on a screen of a display device that is connected to said computer is disclosed. A text entry section of a dialog box is displayed on the screen of the display device. The number of entries stored previously in a memory is counted, and based on the result of the counting step, a selection button is selectively displayed on the screen of the display device. The selection button is preferably a drop-down arrow button, although other button types may also be employed. The method then waits for user focus on said text entry section. Upon user focus, the text entry section is modified based upon actions by the user, and the counting, displaying, waiting, and modifying steps are repeated.

Preferably, the step of displaying the selection button is conditional on the counting step returning a count value greater than zero. The modifying step preferably includes the step of 5 selectively accepting a typed text entry from the user when the user focus is directed to the text entry section, and the typed text entry is preferably parsed after entry. The modifying step preferably also includes the step of selectively performing a list selection routine when the user focus is directed to the selection button, the list selection routine preferably including accepting user selection of an entry from a list of the memory entries. The counting step preferably counts previously accepted typed text entries which contain at least one character.

In accordance with yet another aspect of the present invention, a drop-down list box system for use with a processor, a display device, a main memory, data input means including pointing means, means for storing an operating system and at least one application program, and means for loading said operating system and said application program into main memory is disclosed. The drop-down list box system displays on a screen of said display device a dialog box into which a user enters data during execution of said application program.

A means is provided for displaying an editable text line. A means is also provided for displaying a selection list. A means is provided for selectively displaying a drop-down selection arrow conditional upon the selection list containing at least one entry.

Preferably, the selection list contains previous text entries entered in the editable text line. A parser preferably parses the edited text line contents. The selection list preferably contains previous text entries entered in the editable text line, parsed by the parser, and containing at least one character after the parsing.

One advantage of the present invention is that it retains the conventional appearance of a text entry dialog box used in conventional GUI interfaces.

Another advantage of the present invention is that it allows the user to recall previous text entries.

Yet another advantage of the present invention is that it prevents the user from erroneously selecting the drop-down arrow button when no previous text entries are yet available for recall.

Still further advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

DETAILED DESCRIPTION OF THE PREFERRED EMBODIMENTS

Figure 4:
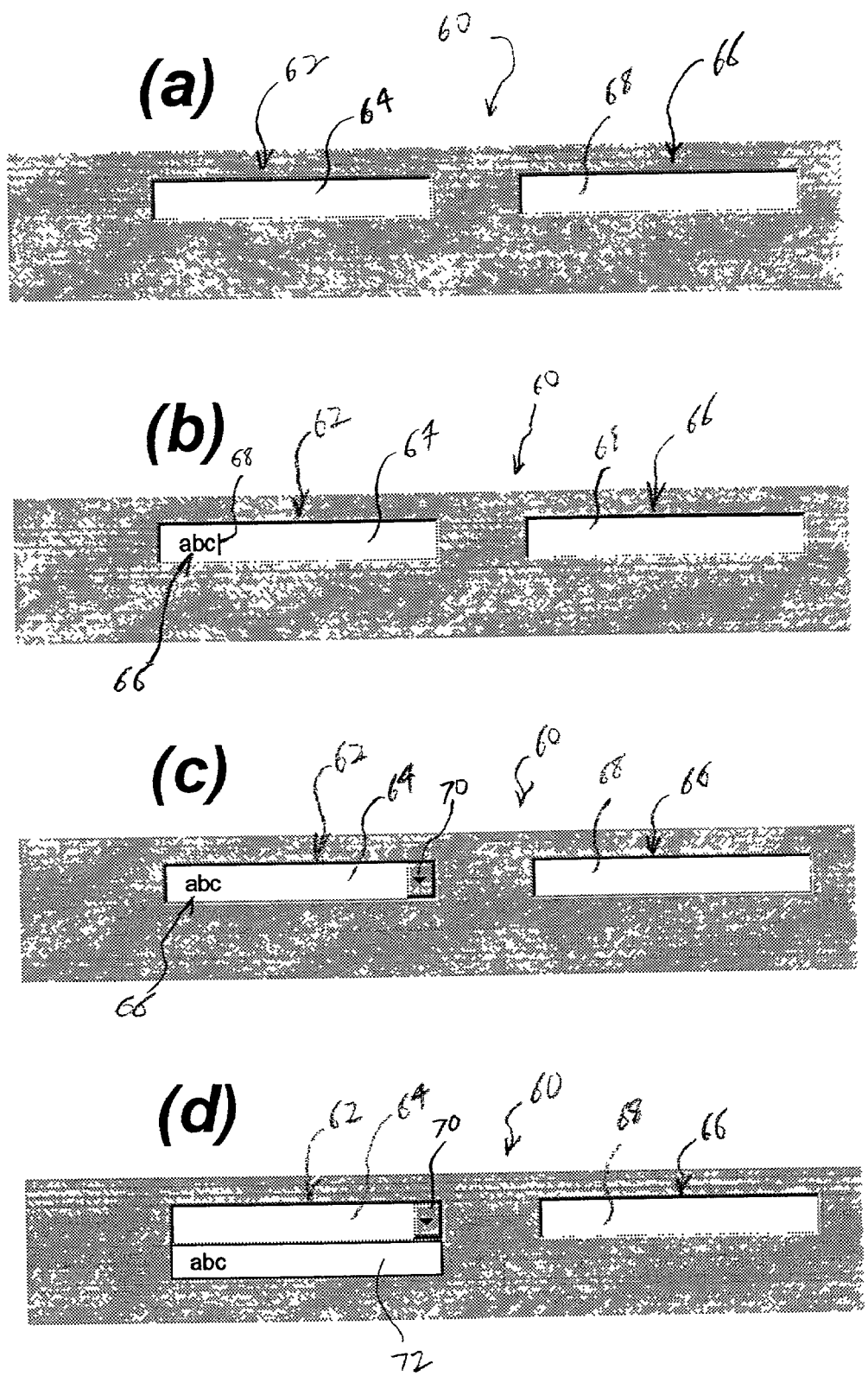
FIG. 4 shows the improved text entry dialog box which permits the user to recall previous text entries in an unambiguous manner; and, FIG. 5 shows a flowchart of the operation of the improved text entry dialog box.

The improved text entry dialog box will be described in accordance with a first preferred embodiment of the invention with reference to FIG. 4(a)-4(d). When the window 60 containing the text entry dialog box 62 is initially started, the user is presented only with a blank entry line 64 as shown in FIG. 4(a). Initially, there are no previous text entries. Therefore, only a text entry space 62 is displayed, without the drop-down selection arrow. Of course, the window may include other input dialog boxes, such as a second improved text entry dialog box 66 for which only the text entry space 68 without the drop-down selection arrow is visible as well. In FIG. 4, second improved text entry dialog box 66 will remain unedited in the description to follow, and so it retains the same appearance throughout parts (a)-(d) of FIG. 4.

Figure 2:
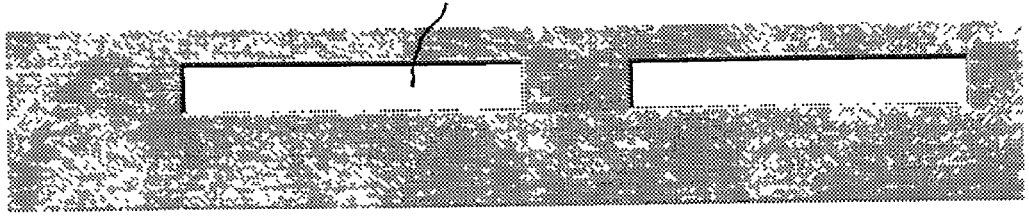
FIG. 2 shows the operation of a conventional text entry dialog box.
Figure 2:
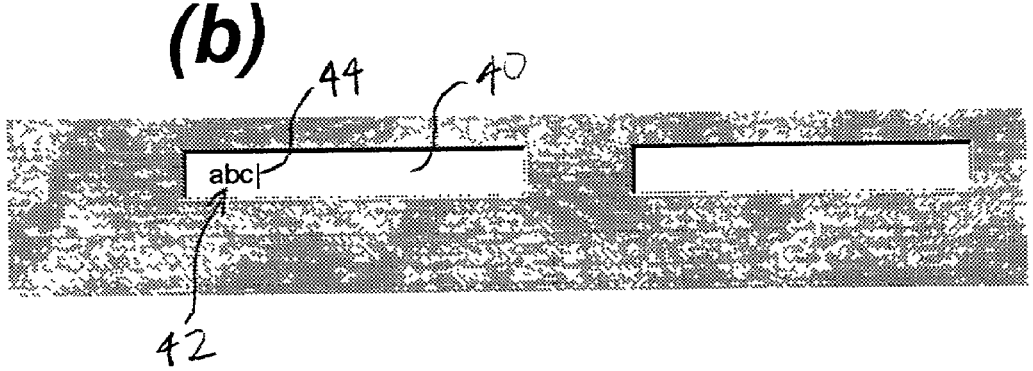
Figure 2:
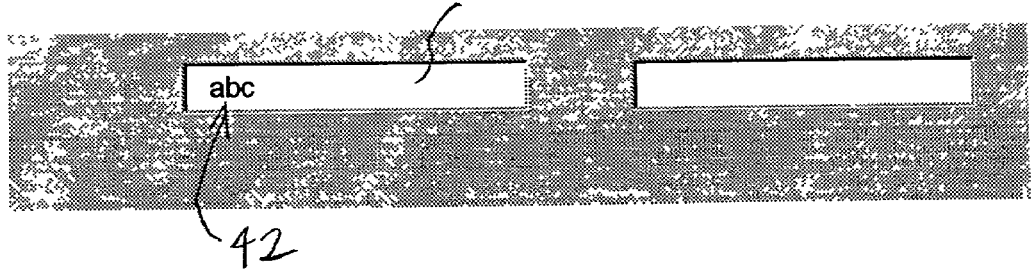
Figure 2:
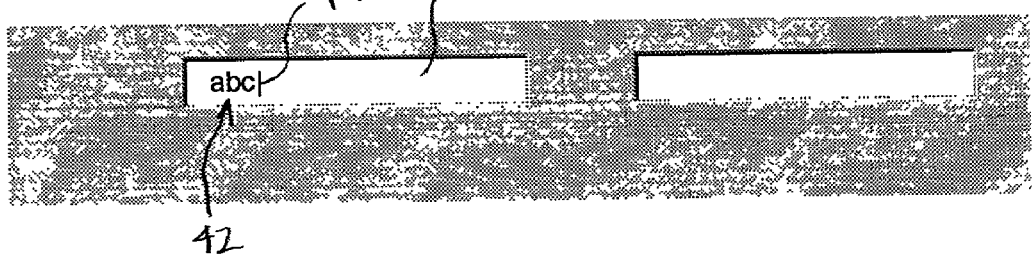
Figure 3:
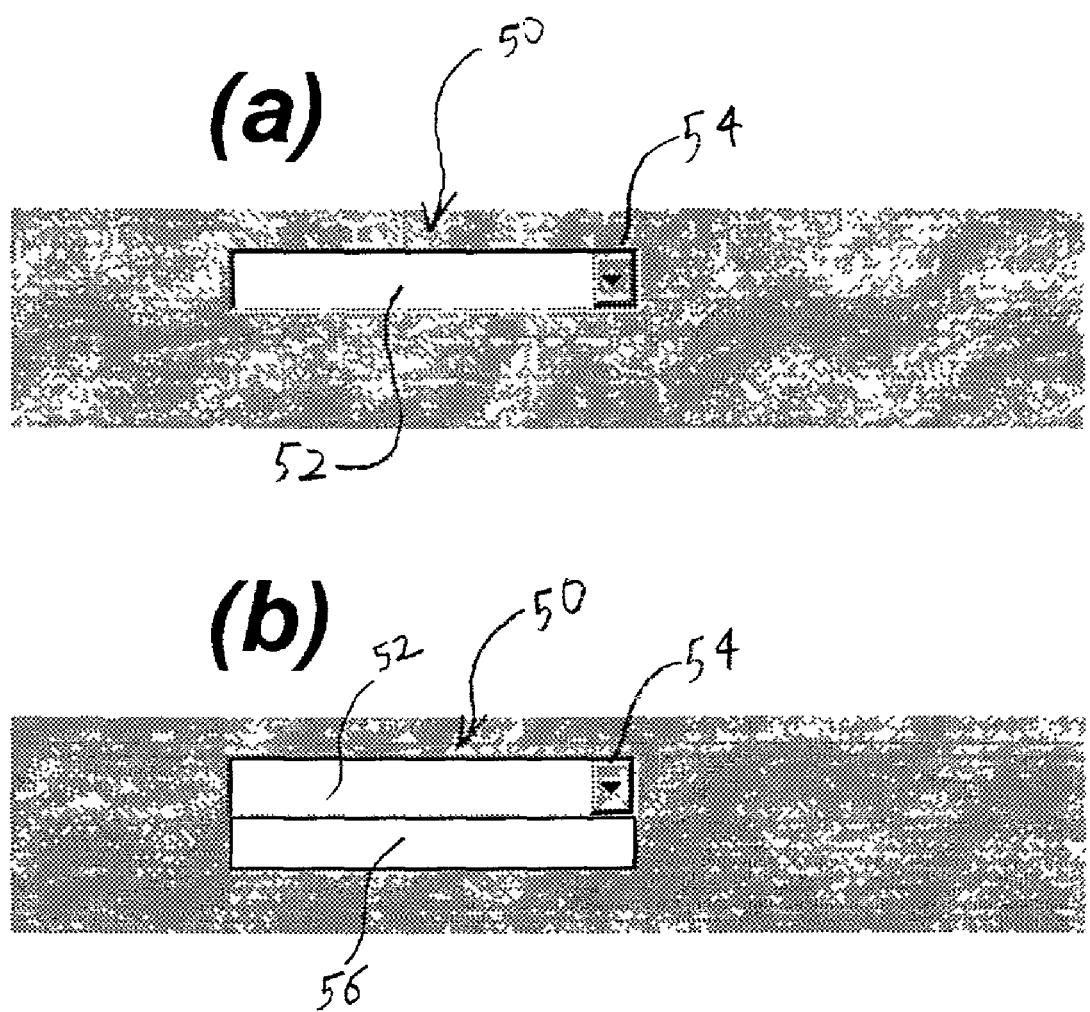
FIG. 3 shows a prior art drop-down combination box which permits recall of previous text entries.

It will be observed that the unedited dialog boxes 62 and 66 are visually indistinguishable from the unedited prior art text entry dialog box 40 shown in FIG. 2 which does not have previous entry recall capability. The typical GUI user will therefore be quite comfortable with the dialog boxes shown in FIG. 4(a), and will readily recognize these dialog boxes as text entry dialog boxes. The unedited improved dialog boxes 62 and 66 are, however, visually different from the prior art drop-down combination box 50 of FIG. 3 because the drop-down combination box 50 includes a drop-down selection button 54. Selection button 54 does not serve any useful purpose in FIG. 3 since there are not yet any previous text entries to recall, and instead serves only to confuse the user as discussed previously. For this reason, the unedited improved dialog boxes 62 and 66 shown in FIGS. 4(a)-4(d) do not initially display a drop-down selection button.

In order to enter text, the user focuses on the entry line 64 and types text 67 via an associated keyboard (not shown) as shown in FIG. 4(b). The typing position is indicated in the conventional manner by cursor 69. It will again be recognized that at this stage the improved text entry dialog box still appears and behaves identically to the prior art dialog box as shown in FIG. 2(b). However, when the user defocuses to thereby register the entered text, either by focusing elsewhere, or by pressing the ENTER key on the associated keyboard or the like, the improved text entry box behaves differently from the prior art text entry box, as seen by comparing FIG. 4(c) with prior art FIG. 2(c). The cursor disappears upon defocusing in both cases. In the case of the improved dialog box, however, a drop-down selection button 70 additionally appears as shown in FIG. 4(c). The drop-down selection button is absent in the prior art text entry box shown in FIG. 2(c) since previous text entries cannot be recalled in the prior art text entry dialog box.

Figure 1:
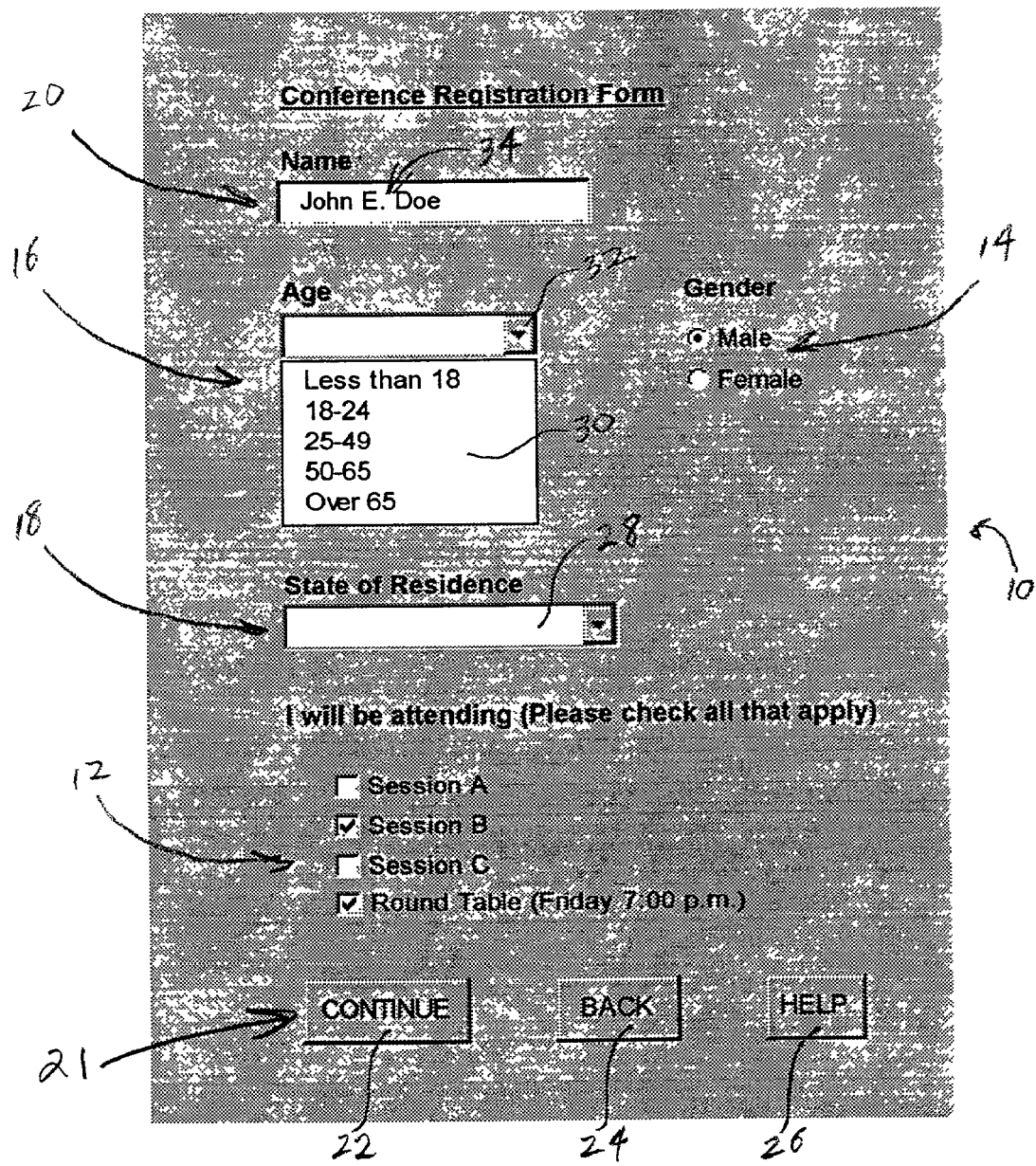
FIG. 1 shows a typical user data entry window in a GUI interface with the form already partially filled out by the user.

As shown in FIG. 4(d), previous text entries may be recalled in with the improved text entry dialog box by selecting the drop-down selection button 70 whereby a drop-down list 72 containing the previous text entries is displayed. Because at the point shown in FIG. 4(d) only a single previous entry has been entered, which in fact corresponds to the present entry "abc", the drop-down list contains only the single entry "abc". However, it is to be appreciated that as additional text entries are input into text entry line 64 they will also be added to the drop-down list 72 for easy recall by selecting drop-down selection button 70. It will also be recognized that the improved text entry box 62 as shown in FIGS. 4(c) and 4(d) where prior text entries are available for recall are visually indistinguishable from a list box such as the "State of Residence" box 18 and the "Age" list box 16 both shown in FIG. 1. However, the user is not prevented from appreciating the text editing capability of text entry line 64 of the improved text entry dialog box 62 because the drop-down selection button 70 did not become available to the user until after the user first entered text by editing text entry line 64.

The invention therefore provides an improved text entry dialog box which provides the user with the look-and-feel of a conventional text entry box, but with the added capability of previous text entry recall. The improved text entry dialog box is furthermore incapable of being confused with a list box.

With continuing reference to FIGS. 4(a)-4(d), it will be recognized that the invention may alternatively be viewed as an improved prior art list box, wherein the text line 64 is editable and the visibility of the drop-down selection arrow 70 is conditional upon the selection list 72 containing at least one entry. Preferably, the selection list 72 is initially empty and therefore inaccessible due to the invisibility of the drop-down selection arrow, and as text entries 67 are made in the editable text line 64 these entries are added to the selection list 72, whereupon the drop-down selection arrow 70 becomes visible to enable recall of these previous editable text line entries.

Figure 5:
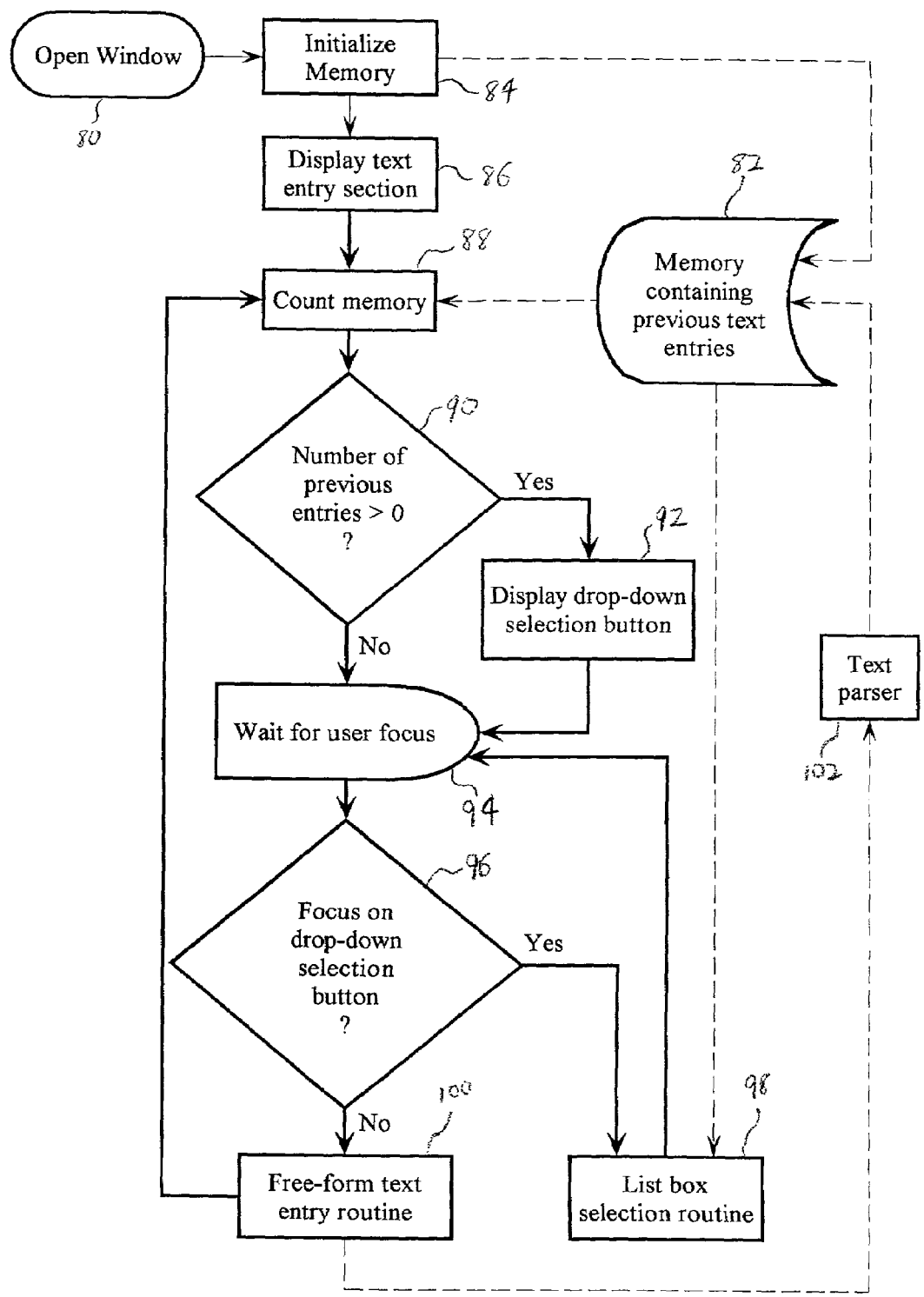

With reference next to FIG. 5, the preferred method by which the improved text entry dialog box facilitates input of text in accordance with a second preferred embodiment of the invention is now described. The method initiates when the associated window 60 (FIG. 4(*a*)) is opened in a step 80. A memory 82 which stores the previously entered text entries is initialized in a step 84. Preferably, the initializing 84 involves emptying memory 82 of any previous contents so that initially there are no previous text entries in memory 82. The text entry section is then displayed in a step 86. This element is displayed regardless of the contents of memory 82. A memory count step 88 is then performed to determine the number of previous text entries stored therein. If the number of previous entries is greater than zero 90 then the drop-down selection button or arrow is displayed in a step 92. Having displayed the appropriate text entry dialog box controls, the dialog box process waits for user focus to be directed to the dialog box in a step 94. This step is consistent with the GUI paradigm in which program flow during data entry is primarily directed by user focus rather than by program structure.

Once user focus is directed to the improved text entry dialog box, the process determines the nature of the user focus. If the focus is on the drop-down selection button 96, then the list box selection routine is executed in a step 98. The details of a list box selection routine are well-known prior art which is employed, for example, in conventional list dialog boxes, and need not be described here in detail. The selection list preferably contains previous text entries stored in memory 82. After the user selects an entry from the list box through the list box selection routine 98, process flow returns to the waiting state 94. Because the selected entry is sourced from memory 82 which contains previous presumably valid entries, there is no need to perform text parsing or another memory count 88 prior to re-entering the waiting mode 94.

It will be recognized that the list box selection routine 98 is not accessible if the previous decision point 90 bypassed display of the drop-down selection button 92, since in that case there is no drop-down selection button on which the user may focus. This is consistent with an objective of the invention to avoid presenting the user with a confusing empty selection list.

If the user focus was not directed to the drop-down selection arrow 96, then it was directed toward the free-form text entry section. In this case, the free-form text entry routine 100 is executed. The free-form text entry routine is again well-known prior art which is not detailed here. The free-form text entry routine displays a cursor and accepts typed user input in the text entry section. The user-supplied text entry may be directly stored in memory 82 for later recall through list box selection routine 98. Preferably, however, the text is first parsed by text parser 102. The text parser may be application-specific. It may perform typical text parsing functions such as stripping leading and/or trailing spaces or converting a number to a preferred format.

An application-specific text parser may additionally substitute an empty string for an invalid string, if appropriate. For example, a text parser for use in conjunction with a numeric input may reject an alphabetic string by replacing it by an empty string. In cases where the user inputs an empty string or where text parser 102 substitutes an empty string for an invalid user input, memory 82 will not receive data, and so no entry will be added to the previous text entry list. Upon completion of the free-form text entry routine 100 process flow is directed back to the memory count step 88, whereby the appropriateness of displaying the drop-down selection button 92 will be re-evaluated in view of the possibly updated memory 82 contents.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A text entry dialog box system for use with a display device, data input means including pointing means, and processor means for executing an application program, and that displays on a screen of said display device a dialog box into which an associated user enters data during execution of said application program, said text entry dialog box system comprising:
    a text entry space in a dialog box displayed on said screen of the display device for free-form entry of text items into the system by the associated user;
    a memory for storing previously entered text items which were previously entered into the text entry space by the associated user;
    means for selectively displaying a selection button on the screen of the display device in association with the dialog box for selection by the pointing means, the selection button being displayed solely when the memory contains at least one previously entered text item; and
    means for displaying a list of the previously entered text items stored in the memory responsive to selection of the selection button by the associated user.

2. The text entry dialog box system according to claim 1, further comprising:
    a parser for parsing the text items as parsed text items prior to storage in the memory; and
    means for selectively storing the parsed text items in said memory based on the parsed text item containing at least one character.

3. The text entry dialog box system according to claim 2, further including:
    means for initializing the memory as empty each time the associated window is started.

4. The text entry dialog box system according to claim 1, wherein:
    the selection button is a drop-down arrow button on the screen of the display device displayed in association with the dialog box; and
    the list of previously entered text items is a drop-down list on the screen of the display device displayed in association with the dialog box.

5. A computer implemented method for facilitating input of text by an associated user using a dialog box on a screen of a display device that is connected to said computer, the method comprising:
    (i) initializing a memory as empty;
    (ii) displaying a text entry section of a dialog box on the screen of the display device;
    (iii) counting entries stored previously in the memory;
    (iv) displaying a drop-down list selection button on the screen of the display device only if the counting produces a value greater than zero;
    (v) receiving a typed text entry from the associated user via the text entry section of the dialog box;
    (vi) updating the memory by adding a new entry corresponding to the typed text entry; and
    (vii) repeating the displaying (ii), counting (iii), and displaying (iv) at least once.

6. The method according to claim 5, further including:
    performing a list selection routine responsive to user selection of the drop-down list selection button.

7. The method according to claim 6, wherein the performing of the list selection routine includes:

displaying a list of the memory entries; and accepting user selection of an entry from the displayed list of the memory entries.

8. The method according to claim 5, wherein:

the counting (iii) includes counting previously accepted typed textentries which contain at least one character.

9. The method according to claim 5, wherein the step of displaying the drop-down list selection button includes:

displaying a drop-down arrow button on the screen of the display device in association with the dialog box.

10. The method according to claim 5, further including:

parsing the received text entry, the parsed text entry being stored in the memory by the updating.

11. A program embodied in a computer readable medium, that when executed by a processor generates a graphical user interface text input dialog including:

a free-form text entry portion displayed on an associated display device for receiving a free-form text entry from an associated user;

a memory storing free-form text entries previously entered by the associated user into the free-form text entry portion;

a drop-down list, selection button displayed in conjunction with the free-form text entry portion only when the memory contains at least one previously entered free-form text entry; and a drop-down selection list portion displayed in conjunction with the free-form text entry portion responsive to activation by the associated user of the drop-down list selection button, file drop-down selection list portion listing the previously entered free-form text entries stored in the memory for selection by the associated user.

12. The program as set forth in claim 11, wherein the drop-down list selection button includes: a down-arrow displayed adjacent the free-form text entry portion.

* * * * *

UNITED STATES PATENT AND TRADEMARK OFFICE
CERTIFICATE OF CORRECTION

PATENT NO. : 7,596,753 B2  Page 1 of 1
APPLICATION NO. : 09/829721
DATED : September 29, 2009
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2018 days.

Signed and Sealed this

Twenty-eighth Day of September, 2010

David J. Kappos
*Director of the United States Patent and Trademark Office*